United States Patent
Swaine et al.

(10) Patent No.: US 7,149,933 B2
(45) Date of Patent: Dec. 12, 2006

(54) DATA PROCESSING SYSTEM TRACE BUS

(75) Inventors: Andrew Brookfield Swaine, Cambridge (GB); Daryl Wayne Bradley, Cambridge (GB); Sheldon James Woodhouse, Stow-cum-Quy (GB)

(73) Assignee: ARM Limited, Cambridge (GB)

( * ) Notice: Subject to any disclaimer, the term of this patent is extended or adjusted under 35 U.S.C. 154(b) by 525 days.

(21) Appl. No.: 10/635,920

(22) Filed: Aug. 7, 2003

(65) Prior Publication Data
US 2005/0034026 A1    Feb. 10, 2005

(51) Int. Cl.
*G06F 11/00* (2006.01)

(52) U.S. Cl. .......................... 714/45; 714/47; 717/124; 717/128

(58) Field of Classification Search ................ 714/45, 714/47; 717/124, 128
See application file for complete search history.

(56) References Cited

U.S. PATENT DOCUMENTS

| | | | |
|---|---|---|---|
| 5,870,541 A * | 2/1999 | Tamura ........................ 714/47 |
| 5,983,379 A * | 11/1999 | Warren ........................ 714/727 |
| 6,021,261 A | 2/2000 | Barrett, Jr. et al. |
| 6,031,847 A * | 2/2000 | Collins et al. ............... 370/508 |
| 6,145,099 A * | 11/2000 | Shindou ....................... 714/37 |
| 6,470,388 B1 | 10/2002 | Niemi et al. |
| 6,584,491 B1 | 6/2003 | Niemi et al. |
| 6,662,347 B1 * | 12/2003 | Wong ............................ 716/4 |
| 6,687,811 B1 * | 2/2004 | Yamada ...................... 712/227 |
| 6,687,860 B1 * | 2/2004 | Iijima et al. ................. 714/718 |
| 7,003,699 B1 * | 2/2006 | Swaine et al. ................ 714/30 |
| 7,007,205 B1 * | 2/2006 | Yeager et al. .................. 714/45 |

FOREIGN PATENT DOCUMENTS

| | | |
|---|---|---|
| DE | 199 30 120 | 1/2001 |
| GB | 2 366 050 | 2/2002 |
| WO | WO 00/63777 | 10/2000 |

* cited by examiner

*Primary Examiner*—Robert Beausoliel
*Assistant Examiner*—Emerson Puente
(74) *Attorney, Agent, or Firm*—Nixon & Vanderhye P.C.

(57) ABSTRACT

An integrated circuit 2 is provided with multiple sources 12, 14, 16, 18 of trace data streams that are input via respective dedicated trace buses 20, 24 to a trace data stream combiner 22, 26. The trace data bus has trace data signal lines ATDATA for carrying trace data signals and trace source identifying signal lines ATID for carrying trace source identifying signals. A trace data stream replicator 28 may be used to replicate a single trace data stream such that the resulting multiple trace data streams may be subject to different post-replication processing/filtering as desired.

28 Claims, 3 Drawing Sheets

DATA PROCESSING SYSTEM TRACE BUS

BACKGROUND OF THE INVENTION

1. Field of the Invention

This invention relates to the field of data processing systems. More particularly, this invention relates to data processing systems including one or more trace data sources operable to generate individual trace data streams for diagnostic purposes.

2. Description of the Prior Art

It is known to provide data processing systems with trace data generating mechanisms. Examples of such systems are the Embedded Trace Macrocells provided by ARM Limited of Cambridge, England. Such trace mechanisms serve to monitor the data processing operations taking place and generate a trace data stream indicative of the data processing operations occurring, such as which instructions are being executed, which data values are being manipulated. This trace data stream is then output (possibly after on-chip buffering) to a diagnostic tool to assist a designer/programmer in debugging the system.

As data processing systems increase in complexity it is becoming common to use system-on-chip designs which typically contain many different data processing elements each performing its own data processing operations and communicating with the other data processing elements. As an example, a single integrated circuit may include a processor core, a digital signal processor and a memory system. Each of these elements can be separately subject to tracing and generate its own trace data stream. A problem with providing separate trace mechanisms for each trace data source is that separate inputs and outputs need to be provided for each trace data source in a manner that disadvantageously consumes pin count. Furthermore, the different trace data output formats of some protocols that are appropriate and/or necessary for some data processing elements can present a difficulty in a combined data stream.

It is known to provide trace systems which include trace source identifiers within the trace data protocol. This approach requires reading/unpacking of the data to determine trace data source.

SUMMARY OF THE INVENTION

Viewed from one aspect the present invention provides apparatus for processing data, said apparatus comprising:

at least one trace data source operable to generate an individual trace data stream including trace data signals and trace source identifying signals; and a trace bus coupled to said at least one trace data source and including trace data signal lines operable to carry trace data signals and trace source identifying signal lines operable to carry trace source identifying signals.

The present technique recognises the need to combine trace data streams from different sources and also the desirability of providing a system which is able to cope with a variety of different trace data sources without imposing undue constraints upon their form or operation. More particularly, the present technique recognises that separately providing data signal lines for carrying trace data signals and trace source identifying signal lines for carrying trace source identifying signals on a trace bus yields a system which is able to deal with multiple trace data sources in a manner that imposes a low level of operational constraints on those trace data sources and yet preserves the flexibility to manipulate the trace data streams simply and effectively based upon trace source identifying signals.

In preferred embodiments of the invention the trace bus also includes one or more data size indicating signal lines operable to carry one or more size indicating signals. In this way, such preferred embodiments are able to utilise different data widths for the trace data signals with a common trace data bus and yet preserve efficiency when this trace data is to be stored or output off-chip by providing associated size data that may be used in compaction processing.

Whilst it will be appreciated that the trace bus mentioned above could be used with a single data source, it is strongly advantageous in systems including a plurality of trace data sources and using a trace data stream combiner to combine trace data streams. In these systems, respective trace data buses may couple the trace data sources to the trace data stream combiner which itself then produces a combined trace data stream using the same trace bus protocol. The trace bus of the present technique is particularly well suited to such a hierarchical approach using multiple trace data streams and in particular further trace data streams may be combined into a combined data stream at a later point if desired.

Preferred embodiments of the invention also provide a trace data stream replicator for replicating a single trace data stream into a plurality of trace data streams. These may then be subject to different post-replication processing, such as forming a low-bandwidth stream for immediate output and a high-bandwidth stream for on-chip buffering.

One technique which is highly useful and that is enabled by the provision of trace source identifying signals on the trace bus is the ability to filter the trace data streams in dependence upon the trace source identifying signals. Some trace data sources may be ignored or captured at low bandwidth whilst others may be captured at high bandwidth.

It will be appreciated by those familiar with the field that the identification of header data within a trace data stream is a common requirement in interpreting a trace data stream and can pose considerable practical difficulties. The present technique allows for a system in which a change in trace source identifying signals occurs whenever the trace data changes its source and accordingly header data may be inserted in the trace data stream at a fixed position relative to that change in trace source identifying signals. This simplifies subsequent interpretation of that trace data stream.

it will be appreciated that the trace data sources can take a wide variety of different forms and may be considered to include the processing elements which they are monitoring, such as a processor core, a digital signal processor and a memory bus monitor. A further preferred trace data source is one which may be software controlled, such as one which generates trace data in response to a software controlled write to one or more predetermined memory locations.

Whilst the present invention could be used in an apparatus composed of separately formed circuit elements, it is particularly well suited to embodiments in the form of an integrated circuit, such as a system-on-chip design.

In order to positively and efficiently control the transfer of data via the trace bus preferred embodiments utilise a valid signal line which is indicative of a trace data source being active and generating trace data signals. The trace bus also advantageously includes a receiver ready signal line indicative of a trace data receiver being active to receive trace data signals. The combination of the valid signal line and the receiver read signal line enables arbitration to be performed between different trace data sources which may simultaneously seek to generate trace data streams.

Viewed from another aspect the present invention provides a method of processing data, said method comprising the steps of:

generating at least one individual trace data stream including trace data signals and trace source identifying signals using a respective trace data source;

carrying trace data signals upon trace data signal lines of a trace data bus; and carrying trace source identifying signals upon trace source identifying signal lines of said trace bus.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
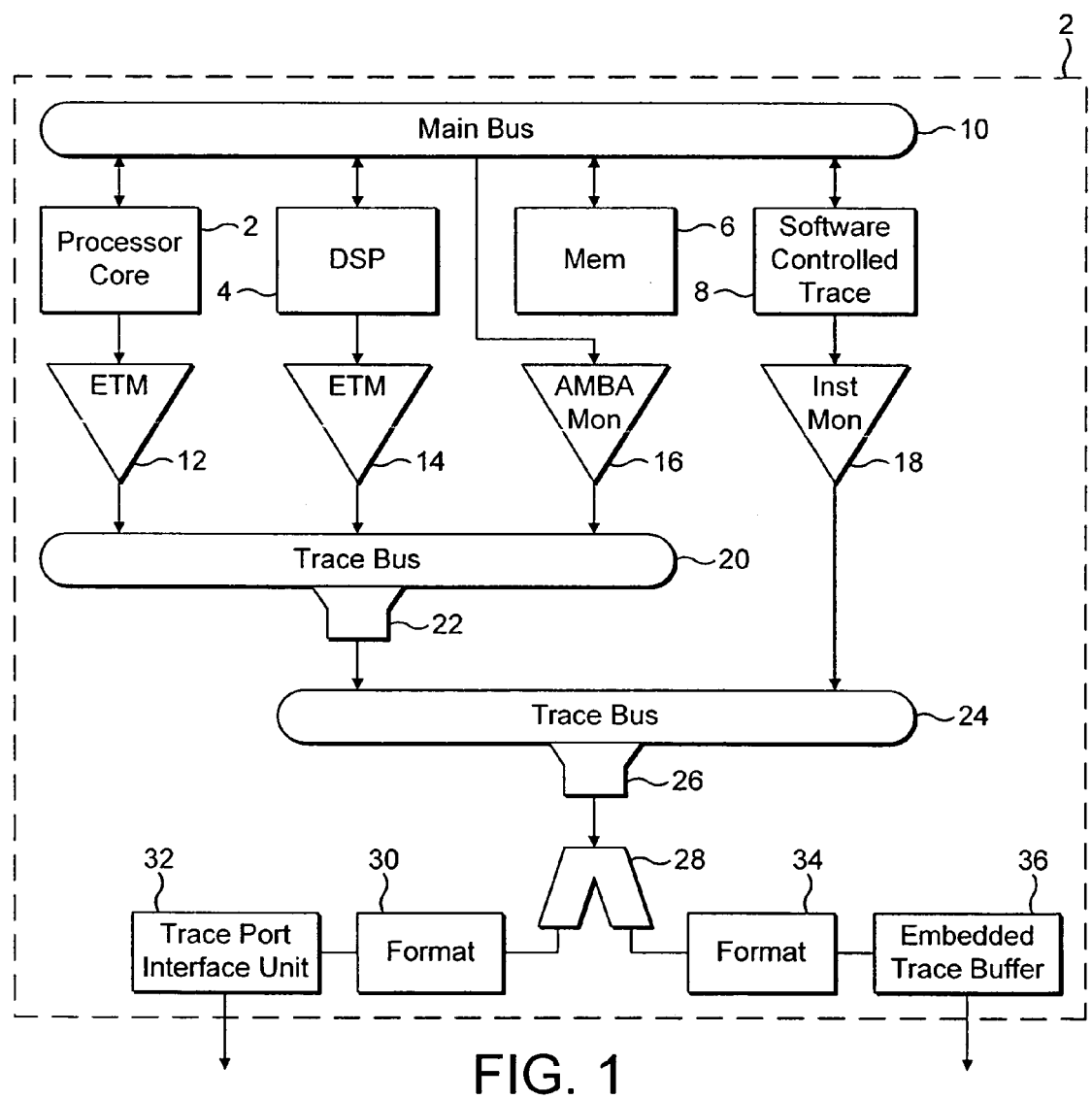
FIG. 1 schematically illustrates an integrated circuit including multiple trace data sources.

FIG. 1 shows an integrated circuit 2 in the form of a system-on-chip integrated circuit including a processor core 2, a digital signal processor 4, a memory 6 and a software controlled trace data source 8 all connected via a main bus 10, such as an AMBA bus as designed by ARM Limited, Cambridge, England. Associated with each of the data processing elements 2, 4, 6, 8 is a trace data generator 12, 14, 16, 18 which is responsive to events and conditions occurring within the data processing element which they are monitoring to generate a trace data stream. The type of events being monitored will be familiar to those in the trace field, such as the instructions being executed, the data values being manipulated, data values being read or written to particular memory locations or the writing of a data value to a predetermined memory location serving as a trace output (e.g. the action of the software controlled trace generator is such that a data value written to a location within a predetermined address range is output as trace data so as to allow software being executed to be instrumented to output diagnostic data in the form of trace information).

The trace data streams that have been generated are output on a respective trace bus 20, 24 to a respective trace data stream combiner 22, 26. Each of the trace data sources 12, 14, 16, 18 is provided with a trace data bus and the associated trace data stream combiner 22, 26 acts as a multiplexer. The output of the trace data stream combiner 22, 26 is also in the form of a trace bus having the same signals.

As will be seen in FIG. 1, the trace data streams may be hierarchically combined, i.e. the first trace data stream combiner 22 combines the trace data streams from the trace sources 12, 14, 16 and the second trace data stream combiner 26 combines the trace data stream output from the first trace data stream combiner 22 with that output from the software controlled trace data generator 18.

A trace data stream replicator 28 serves to replicate the trace data stream output from the trace data combiner 26 into two initially identical trace data streams that are fed through different channels. The first of these trace data streams serves as a low-bandwidth output which is passed through a formatter 30 and a trace port interface unit 32 before being output off-chip in real time. A second of the trace data streams output from the trace data stream replicator 28 is output through a formatter 34 and then stored within an on-chip embedded trace buffer memory 36. Since this data is kept on-chip, it may be a high-bandwidth signal capturing a higher level of detail. It will be appreciated that the formatters 30, 34 serve to compress and compact the trace data stream present on the trace bus to have a more information dense form to preserve off-chip bandwidth and storage space within the embedded trace buffer memory 36. The techniques for compressing trace data will be familiar to those in the technical field and will not be described further herein.

Figure 2:
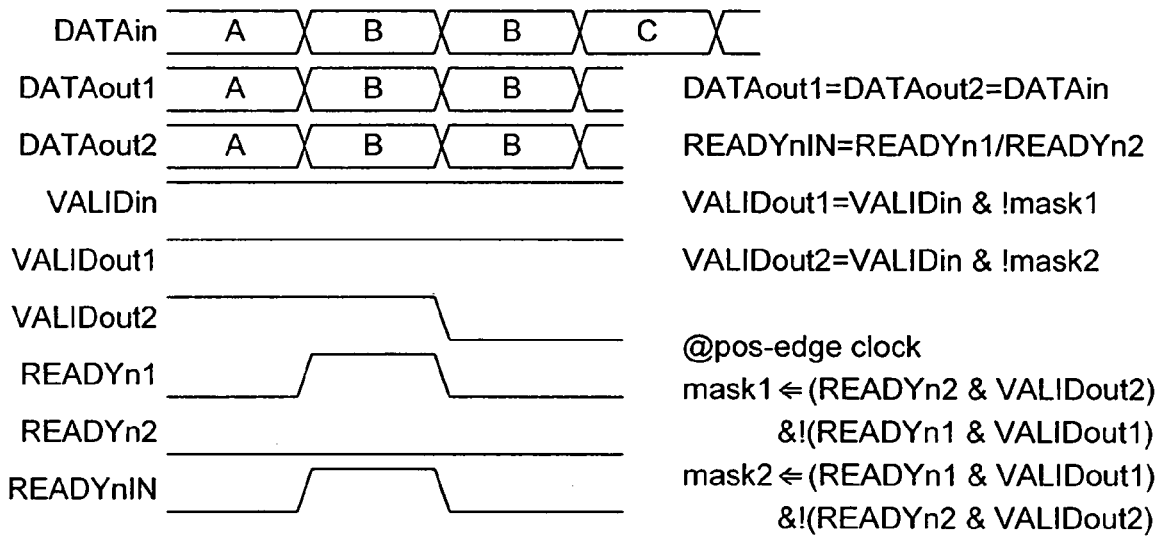
FIG. 2 schematically illustrates a trace data replicator.

FIG. 2 schematically illustrates the operation of the trace data stream replicator 28. This receives a single trace data stream $DATA_{in}$ and generates two identical output trace data streams $DATA_{out1}$ and $DATA_{out2}$. The timing of the generation of these signals is controlled by an exchange of READY and VALID signals as will be discussed later in relation to FIG. 4.

Figure 3:
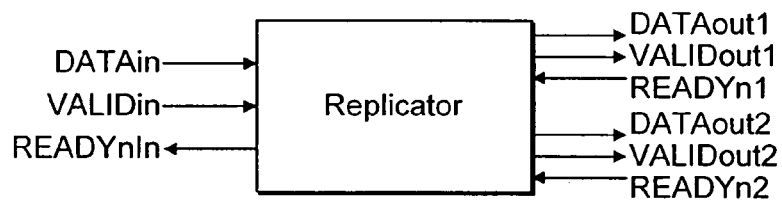
FIG. 3 illustrates a trace data bus.
Figure 3:
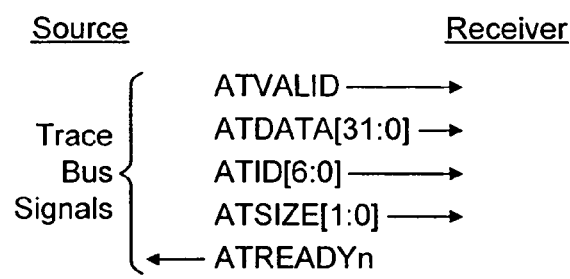

FIG. 3 schematically illustrates the trace data bus 20, 24 in more detail. The trace data bus 20, 24 includes a valid signal ATVALID which indicates that the trace data source is outputting valid trace data and a trace data source ID onto the trace bus 20, 24. A 32-bit trace data signal ATDATA is generated by the trace data source and output on the trace bus 20, 24 to the trace data receiver. A 7-bit trace data source identifying signal ATID is generated by the trace data source and output on the trace bus 20, 24 to the trace data receiver. The trace bus 20, 24 also includes trace data size identifying signals ATSIZE which are generated by the trace data source and received by the trace data receiver and serve to indicate the data width upon the signals ATDATA. A two-bit size signal is provided and this may be used to specify how many bytes of the four bytes available on the 32-bit ATDATA portion of the trace bus 20, 24 are being used by the current trace data source. This size information is highly useful for the formatters 30, 34 which subsequently compress, or at least reformat the trace data stream.

A trace data receiver ready single ATREADYnis generated by the trace data receiver and output to the trace data source. In the context of the embodiment of FIG. 1, the trace data receiver may be either the trace data stream combiner 26 or the trace data stream combiner 22 or 28 (replicator), 32 (TPIU), 36 (ETB) whilst the trace signal sources may be any of the sources 12, 14, 16 and 18.

FIG. 3 illustrates that the trace data signals ATDATA and the trace source identifying signals ATID are provided with their own dedicated signal lines on the trace bus 20, 24. The provision of the trace source identifying signals as a separate portion on the trace bus 20, 24 frees the protocol and format of the trace data itself ATDATA from having to have embedded within it trace source identifying signals for use within a multi-source environment. This provides an advantageously modular and scaleable structure for supporting multi-source tracing.

Another feature of the provision of the trace data source identifying signals is that selective filtering or other processing may be performed upon the trace data stream in dependence upon the trace source data identifying signals. Thus, the formatters 30, 34 of FIG. 1 may selectively remove trace data associated with an "uninteresting" trace data source whilst maintaining trace data associated with a more critical trace data source in its full form. The trace data source identifying signals may be also used to insert appropriate trace data source identifying codes within a combined trace data output stream that is generated by the formatters 30, 34.

Figure 4:
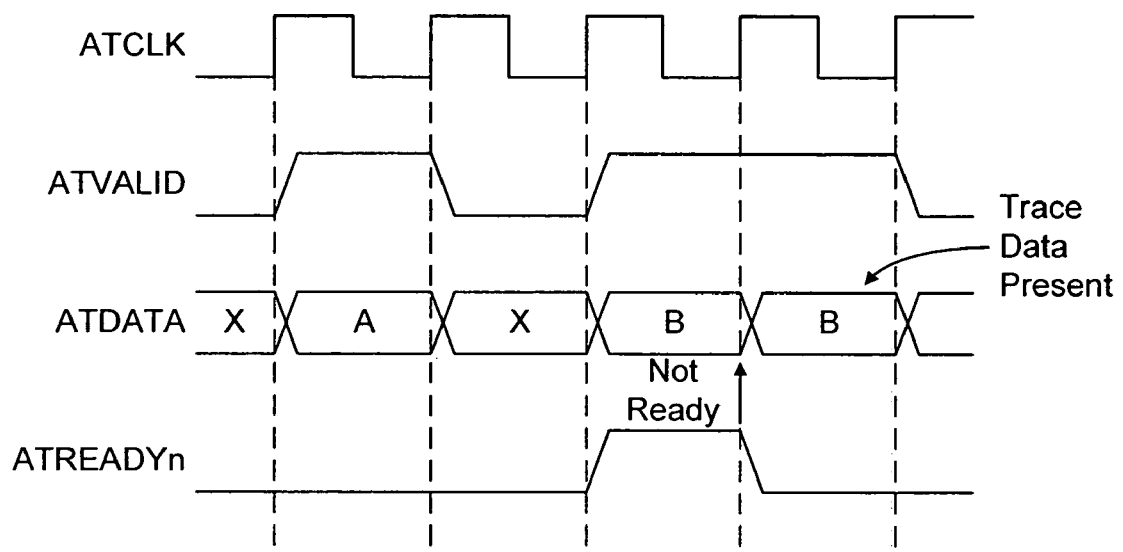
FIG. 4 illustrates the interaction between a valid signal, a data signal and a ready signal.

FIG. 4 schematically illustrates the action of the valid and ready signals in controlling the sending of trace data from a trace data source to a trace data receiver. A first trace data word A is sent and is indicated as being asserted upon the trace bus 20, 24 by the ATVALID signal going high. Whilst the trace data word A is being output the ATREADYn signal is low indicating that the trace data receiver is ready to receive that trace data word and accordingly that trace data word is successfully captured. Sometime later the trace data source tries to output a second trace data word B. At this time the ready signal ATREADYn is high and so this trace data word is resent in the following cycle by which time the ready signal has gone low and the trace data word B is successfully captured. Thus, a trace data receiver can effectively arbitrate between multiple trace data sources. Techniques for arbitrating between trace data sources, alternatively described as bus masters, will be familiar to designers of other system busses, for example a main bus 10. The trace data sources assume they will be able to send their trace data and assert it on their private trace bus to the trace data receiver. The trace data receiver indicates whether or not it was ready to receive that data using the ready signal. If the ready signal was not asserted when the trace data was sent, then the trace data source resends the trace data.

Figure 5:
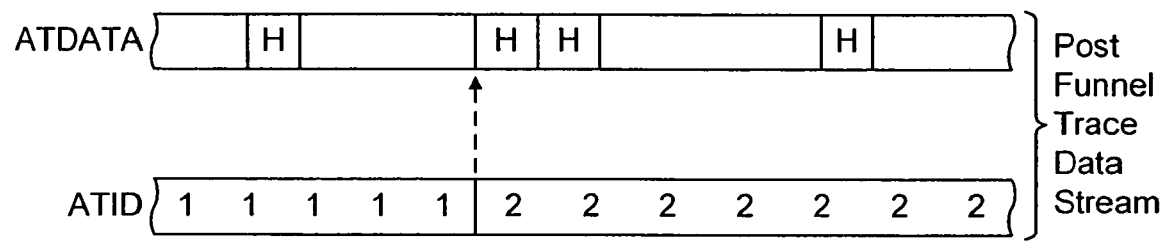
FIG. 5 schematically illustrates the relationship between a change in trace source identifying signal and the presence of header data within the trace data.

FIG. 5 schematically illustrates the relationship between trace data source identifying signals and header data within the trace data stream. As will be familiar to those in the tracing field header data is often inserted within a trace data stream to indicate parameters associated with the following trace data. This header data must be correctly identified within the trace data stream in order that it can be distinguished from trace data itself and properly decoded to be used in the subsequent decoding of the trace data. The correct identification of header data within a trace data stream is a problem within the tracing field. The present technique provides a system wherein whenever the trace data source identifying signal changes, a data header is inserted with a predetermined location relative to that change in trace data source identifying signal. In the example illustrated, the header is inserted at the point at which the trace data source identifying signal itself changes, although a fixed offset could be used instead. This simplifies subsequent processing of the trace data stream since by monitoring the trace source identifying signal for changes, header data can be identified in the trace data and accordingly properly decoded.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   at least one trace data source operable to generate an individual trace data stream including trace data signals and trace source identifying signals;
   a trace bus coupled to said at least one trace data source and including trace data signal lines operable to carry trace data signals and trace source identifying signal lines operable to carry trace source identifying signals;
   a plurality of trace data sources operable to generate respective individual trace data streams each including trace data signals and trace source identifying signals;
   a trace data stream combiner operable to receive and to combine said individual trace data streams to form a combined trace data stream including trace data signals and trace source identifying signals, wherein a plurality of trace buses, each including said trace data signal lines and said trace source identifying signal lines, respectively couple said trace data sources to said trace data stream combiner and carry said combined trace data stream from said trace data stream combiner.

2. Apparatus as claimed in claim 1, wherein said trace data bus includes one or more data size indicating signal lines operable to carry one or more size indicating signals indicative of how many of said trace data signal lines are carrying trace data signals.

3. Apparatus as claimed in claim 1, wherein said combined trace data stream is coupled as an input to a further trace data stream combiner to be combined with one or more further trace data streams.

4. Apparatus as claimed in claim 1, comprising a trace data filter operable to perform trace data filtering in dependence upon said trace source identifying signals.

5. Apparatus as claimed in claim 1, wherein said trace source comprises a software triggered trace data generator operable such that a software controlled write to one or more predetermined memory location triggers generation of a trace data stream by said software triggered trace data generator.

6. Apparatus as claimed in claim 1, wherein said trace data source includes one of:
   a processor core;
   a digital signal processor; and
   a memory bus monitor.

7. Apparatus as claimed in claim 1, wherein said apparatus comprises an integrated circuit.

8. Apparatus as claimed in claim 1, wherein said trace bus includes a trace data valid signal line operable to carry a valid signal generated by said trace data source and indicative of said trace data source being active to generate said trace data signals.

9. Apparatus as claimed in claim 1, wherein said trace bus includes a trace data receiver ready signal line operable to carry a ready signal generated by a trace data receiver coupled to said data bus and indicative of said trace data receiver being active to receive said trace data signals.

10. Apparatus for processing data, said apparatus comprising:
    at least one trace data source operable to generate an individual trace data stream including trace data signals and trace source identifying signals;
    a trace bus coupled to said at least one trace data source and including trace data signal lines operable to carry trace data signals and trace source identifying signal lines operable to carry trace source identifying signals; and
    a trace data stream replicator operable to receive a single input trace data stream as an input and to replicate said single trace data stream to form a plurality of output trace data streams.

11. Apparatus as claimed in claim 10, wherein said plurality of output trace data streams are subject to different post-replication trace data stream processing.

12. Apparatus as claimed in claim 11, wherein said apparatus is an integrated circuit and one of said output trace data streams is directed to an off-chip output port and one of said output trace data streams is directed to an on-chip trace data buffer memory.

13. Apparatus for processing data, said apparatus comprising:
at least one trace data source operable to generate an individual trace data stream including trace data signals and trace source identifying signals;
a trace bus coupled to said at least one trace data source and including trace data signal lines operable to carry trace data signals and trace source identifying signal lines operable to carry trace source identifying signals;
a trace data stream replicator operable to receive a single input trace data stream as an input and to replicate said single trace data stream to form a plurality of output trace data streams, wherein said plurality of output trace data streams are subject to different post-replication trace data stream processing, wherein said apparatus is an integrated circuit and one of said output trace data streams is directed to an off-chip output port and one of said output trace data streams is directed to an on-chip trace data buffer memory; and
a trace data filter operable to perform trace data filtering upon trace data directed to said off-chip data port to form low bandwidth trace data.

14. Apparatus for processing data, said apparatus comprising:
at least one trace data source operable to generate an individual trace data stream including trace data signals and trace source identifying signals; and
a trace bus coupled to said at least one trace data source and including trace data signal lines operable to carry trace data signals and trace source identifying signal lines operable to carry trace source identifying signals, wherein a change in trace data source upon said trace bus is accompanied by a change in said trace source identifying signals and a trace data header is output upon said trace data signal lines at a predetermined time following a change in trace data source, whereby a change in trace source identifying signals serves as a marker indicative of a position of a trace data header.

15. A method of processing data, said method comprising the steps of:
generating at least one individual trace data stream including trace data signals and trace source identifying signals using a respective trace data source;
carrying trace data signals upon trace data signal lines of a trace data bus;
carrying trace source identifying signals upon trace source identifying signal lines of said trace bus
generating a plurality of individual trace data streams each including trace data signals and trace source identifying signals with respective trace data sources; and
combining said individual trace data streams to form a combined trace data stream including trace data signals and trace source identifying signals upon a combined stream trace data bus.

16. A method as claimed in claim 15, comprising carrying one or more size indicating signals lines upon data size indicating signal lines of said trace bus, said size indicating signals being indicative of how many of said trace data signal lines are carrying trace data signals.

17. A method as claimed in claim 15, wherein said combined trace data stream is combined with one or more further trace data streams.

18. A method as claimed in claim 15, comprising filtering trace data in dependence upon said trace source identifying signals.

19. A method as claimed in claim 15, wherein a software controlled write to one or more predetermined memory location triggers generation of a trace data stream by a software triggered trace data generator.

20. A method as claimed in claim 15, wherein said trace data source includes one of:
a processor core;
a digital signal processor; and
a memory bus monitor.

21. A method as claimed in claim 15, wherein said method is performed upon an integrated circuit.

22. A method as claimed in claim 15, comprising carrying a valid signal upon a trace data valid signal line of said trace data bus, said valid signal being indicative of said trace data source being active to generate said trace data signals.

23. A method as claimed in claim 15, comprising carrying a trace data receiver ready signal upon a trace data receiver ready signal line of said trace data bus, said trace data receiver ready signal being indicative of said trace data receiver being active to receive said trace data signals.

24. A method of processing data, said method comprising the steps of:
generating at least one individual trace data stream including trace data signals and trace source identifying signals using a respective trace data source;
carrying trace data signals upon trace data signal lines of a trace data bus;
carrying trace source identifying signals upon trace source identifying signal lines of said trace bus, and
replicating a single trace data stream to form a plurality of output trace data streams.

25. A method as claimed in claim 24, wherein said plurality of output trace data streams are subject to different post-replication trace data stream processing.

26. A method as claimed in claim 25, wherein said method is performed upon an integrated circuit and one of said output trace data streams is directed to an off-chip output port and one of said output trace data streams is directed to an on-chip memory.

27. A method of processing data, said method comprising the steps of:
generating at least one individual trace data stream including trace data signals and trace source identifying signals using a respective trace data source;
carrying trace data signals upon trace data signal lines of a trace data bus;
carrying trace source identifying signals upon trace source identifying signal lines of said trace bus,
replicating a single trace data stream to form a plurality of output trace data streams, wherein said plurality of output trace data streams are subject to different post-replication trace data stream processing,
filtering trace data directed to said off-chip data port to form low bandwidth trace data, wherein said method is performed upon an integrated circuit and one of said output trace data streams is directed to an off-chip output port and one of said output trace data streams is directed to an on-chip memory.

28. A method of processing data, said method comprising the steps of:

generating at least one individual trace data stream including trace data signals and trace source identifying signals using a respective trace data source;

carrying trace data signals upon trace data signal lines of a trace data bus;

carrying trace source identifying signals upon trace source identifying signal lines of said trace bus, wherein a change in trace data source upon said trace bus is accompanied by a change in said trace source identifying signals and a trace data header is output upon said trace data signal lines at a predetermined time following a change in trace data source, whereby a change in trace source identifying signals serves as a marker indicative of a position of a trace data header.

* * * * *